(No Model.)

J. MITCHELL.
CONTACT TROLLEY FOR ELECTRIC RAILWAY CARS.

No. 413,287. Patented Oct. 22, 1889.

Witnesses:
D. W. Gardner
Ftm. H. Capel

Inventor:
James Mitchell
By H. L. Townsend
Atty

UNITED STATES PATENT OFFICE.

JAMES MITCHELL, OF DES MOINES, IOWA.

CONTACT-TROLLEY FOR ELECTRIC-RAILWAY CARS.

SPECIFICATION forming part of Letters Patent No. 413,287, dated October 22, 1889.

Application filed June 21, 1889. Serial No. 315,053. (No model.)

*To all whom it may concern:*

Be it known that I, JAMES MITCHELL, a citizen of the United States, and a resident of Des Moines, in the county of Polk and State of Iowa, have invented a certain new and useful Contact-Trolley for Electric-Railway Cars, of which the following is a specification.

My invention relates to traveling electric contacts designed to run upon a fixed electric conductor and carried by a vehicle or moving object to which electric energy is supplied from the fixed conductor through such contact.

My invention is especially applicable to revolving trolleys used in connection with electrically-propelled cars deriving the energy for the motor upon them from a fixed wire or conductor parallel to the track.

The object of my invention is to obviate a practical difficulty which arises frequently where the conductor is out of parallel with the direction in which the car moves, and which frequently causes the contact or trolley to jump from the wire or conductor.

I have herein illustrated my invention as applied to an under-running contact or trolley borne by a vehicle and adapted to make contact with an aerial power wire or conductor.

My invention consists, essentially, in mounting the contact, of whatever nature, upon a suitably-swiveled support carried by the arm or bar which projects from the vehicle.

My invention consists, further, in the combination, with the contact and its swiveled support, of a centering-spring.

Figure 1:
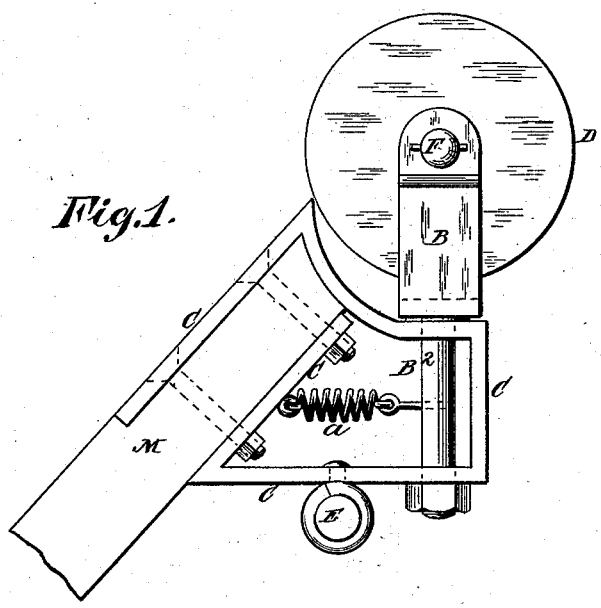
Figure 2:
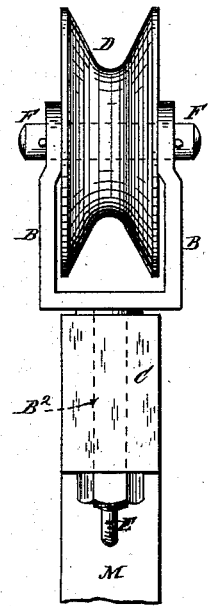

In the accompanying drawings, in Figure 1, I have shown in side elevation a revolving trolley mounted on the end of a trolley arm or pole in accordance with my invention. Fig. 2 is an edge view of the device.

Referring to the drawings, D indicates the usual revolving contact wheel or trolley, and F the spindle or axle of such wheel.

B indicates the bearing for the trolley-wheel, such bearing being in the present instance shown as in the form of a fork, and as provided with a downwardly-extending spindle $B^2$, which in turn is swiveled in a frame C, of any suitable character. The frame C is secured in any proper way to the trolley arm or pole M, mounted and applied in the usual or any other desired manner.

At $a$ is indicated a spring connected to the swiveled bearing for the trolley and adapted to bring the wheel into parallel with the trolley-arm when it is removed from contact with the bar, wire, or conductor.

E indicates a screw-eye for attachment of the trolley-cord employed in swinging the trolley-arm at the terminus of the line.

While I have shown one way of swiveling the bearing for the contact device, I do not limit myself to such special mechanism; nor do I limit myself to the particular form of centering-spring $a$, as it is obvious that a spring or springs might be applied in other ways to the swiveled bearing so as to center the same.

What I claim as my invention is—

1. The combination, with the trolley arm or pole M, of a bearing for the trolley vertically swiveled on the end of said arm, so as to permit the trolley to turn in a substantially horizontal plane into different angular positions with reference to the arm or pole, as and for the purpose described.

2. The combination, with the trolley arm or pole M, of a rotating trolley carried by the same, and a bearing for said trolley mounted at the end of the arm on a vertical swivel beneath the trolley.

3. The combination, with a traveling electric contact mounted on a swiveled bearing, of a centering-spring, as and for the purpose described.

4. The combination, with a contact-trolley, of a fork-bearing having a spindle by which it is swiveled, and a centering-spring for bringing the trolley into parallel with the arm or support, as and for the purpose described.

5. The combination, with the contact-trolley, of the vertical fork B, having spindle $B^2$, the frame C, in which the spindle turns, a centering-spring $a$, and an arm or support M, to which the frame is attached.

Signed at Des Moines, in the county of Polk and State of Iowa, this 17th day of June, A. D. 1889.

JAMES MITCHELL.

Witnesses:
R. N. BAYLIES,
W. M. LANPHERE.